US007593856B2

(12) United States Patent
Martinez (10) Patent No.: US 7,593,856 B2
(45) Date of Patent: Sep. 22, 2009

(54) BRAND RECOGNITION SYSTEM

(75) Inventor: Loretta A. Martinez, Moriarty, NM (US)

(73) Assignee: Nickel Brand Software, Inc., Moriarty, NM (US)

( * ) Notice: Subject to any disclaimer, the term of this patent is extended or adjusted under 35 U.S.C. 154(b) by 877 days.

(21) Appl. No.: 11/032,638

(22) Filed: Jan. 10, 2005

(65) Prior Publication Data

US 2005/0217590 A1 Oct. 6, 2005

Related U.S. Application Data

(60) Provisional application No. 60/535,676, filed on Jan. 9, 2004, provisional application No. 60/592,444, filed on Jul. 30, 2004.

(51) Int. Cl.
G06F 17/60 (2006.01)
A01K 1/10 (2006.01)
G06K 9/36 (2006.01)
G08B 23/00 (2006.01)

(52) U.S. Cl. .............. 705/1; 119/51.02; 428/40.1; 428/40.5; 428/195; 382/117; 382/116; 382/110; 382/289; 382/290; 382/174; 340/573.3; 340/573.1; 600/30

(58) Field of Classification Search .............. None
See application file for complete search history.

(56) References Cited

U.S. PATENT DOCUMENTS 3,722,472 A 3/1973 Homestead et al.
4,817,166 A * 3/1989 Gonzalez et al. ............ 382/105
6,081,206 A * 6/2000 Kielland ...................... 340/937
6,111,985 A * 8/2000 Hullender et al. ........... 382/229
6,198,834 B1 3/2001 Belk et al.
6,424,727 B1 7/2002 Musgrave
6,433,706 B1 * 8/2002 Anderson et al. ............ 340/937
7,031,553 B2 * 4/2006 Myers et al. ................. 382/289
7,164,361 B2 * 1/2007 Poliska ...................... 340/573.3
7,519,748 B2 * 4/2009 Kuzmin ....................... 710/67
2005/0258967 A1* 11/2005 Poliska ...................... 340/573.3
2008/0215473 A1* 9/2008 Cashman et al. .............. 705/37

OTHER PUBLICATIONS

SATOP: New Mexico; vol. 3, Issue: 3; Jul.-Sep. 2004.*
LP_1; which on the google book search comes from "Processes and Foundation for Virtual Organizations".*
"Traceability in cattle and small ruminants in Canada"; Rev. sci. tech. Off. int. Epiz., 2001, 20 (2), 510-522; K. Stanford, J. Stitt, J.A. Kellar & T. A. McAllister.*

* cited by examiner

*Primary Examiner*—John G. Weiss
*Assistant Examiner*—Matthew L Brooks
(74) *Attorney, Agent, or Firm*—Jeffrey D. Myers; Justin R. Jackson; Peacock Myers, P.C.

(57) ABSTRACT

Computer software for and method of determining livestock ownership comprising inputting an image of a livestock brand whose ownership is to be determined, automatically determining one or more computed closest fits to the image from a database of livestock brands, and outputting owner information from the database of livestock brands concerning one or more of the one or more computed closest fits.

7 Claims, 8 Drawing Sheets

POSITION THEORY

The *POSITION THEORY* is based on a nine-point wheel, the ninth position being the center of the wheel. Each spoke of the wheel is given a position number and a title for reference. The order of the wheel begins at the top a goes counter clockwise, completing a circle. Counter clockwise is relative to the rule of reading a brand "left to right, top to bottom and outside to inside". The positions are defined as:

Position one, (P1) is labeled the right position (ie: a right R is drawn as R ).

Position two, (P2) is labeled the leaning position (ie: a leaning R is drawn as ℞ ).

Position three, (P3) is labeled the lazy position (ie: a lazy R is drawn as ɑ ).

Position four, (P4) is labeled the lazy bottom position (ie: a lazy bottom R is drawn as ⱷ ).

Position five, (P5) is labeled the crazy position (ie: a crazy R is drawn as Я ).

Position six, (P6) is labeled the tumbled position (ie: a tumbled R is drawn as ⱷ ).

Position seven, (P7) is labeled the tumbling position (ie: a tumbling R is drawn as ⱷ ).

Position eight, (P8) is labeled the tilted position (ie: a tilted R is drawn as ℞ ).

Position nine, (P9) is labeled the micro position (ie: a micro R), which may be drawn in any of the defined, allowable positions

Fig. 4

All existing brands: alpha, numeric and characters have been defined according to the position theory. It is important to utilize a standard terminology that is in a position definition. The term is *reverse*. Reverse is used when the brand can be reversed and it has its own *unique presentation value (UPV)*. See figures 1 and 2. Some letters create a reverse UPV just by position definition. See figure 3.

The term is lower case this term simply identifies the letter in its lower case UPV. Again, the lower case letter can be reversed creating a new UPV.

Figure 5:
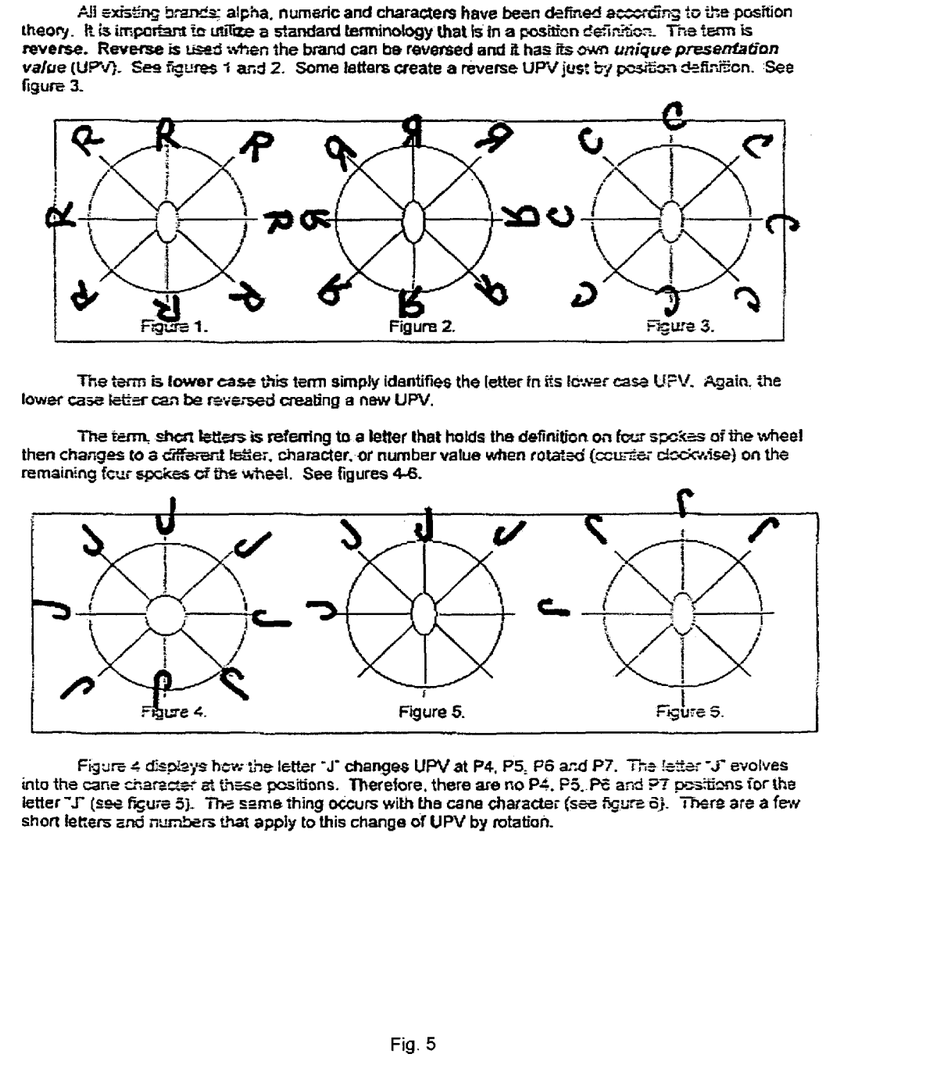
Figure 6:
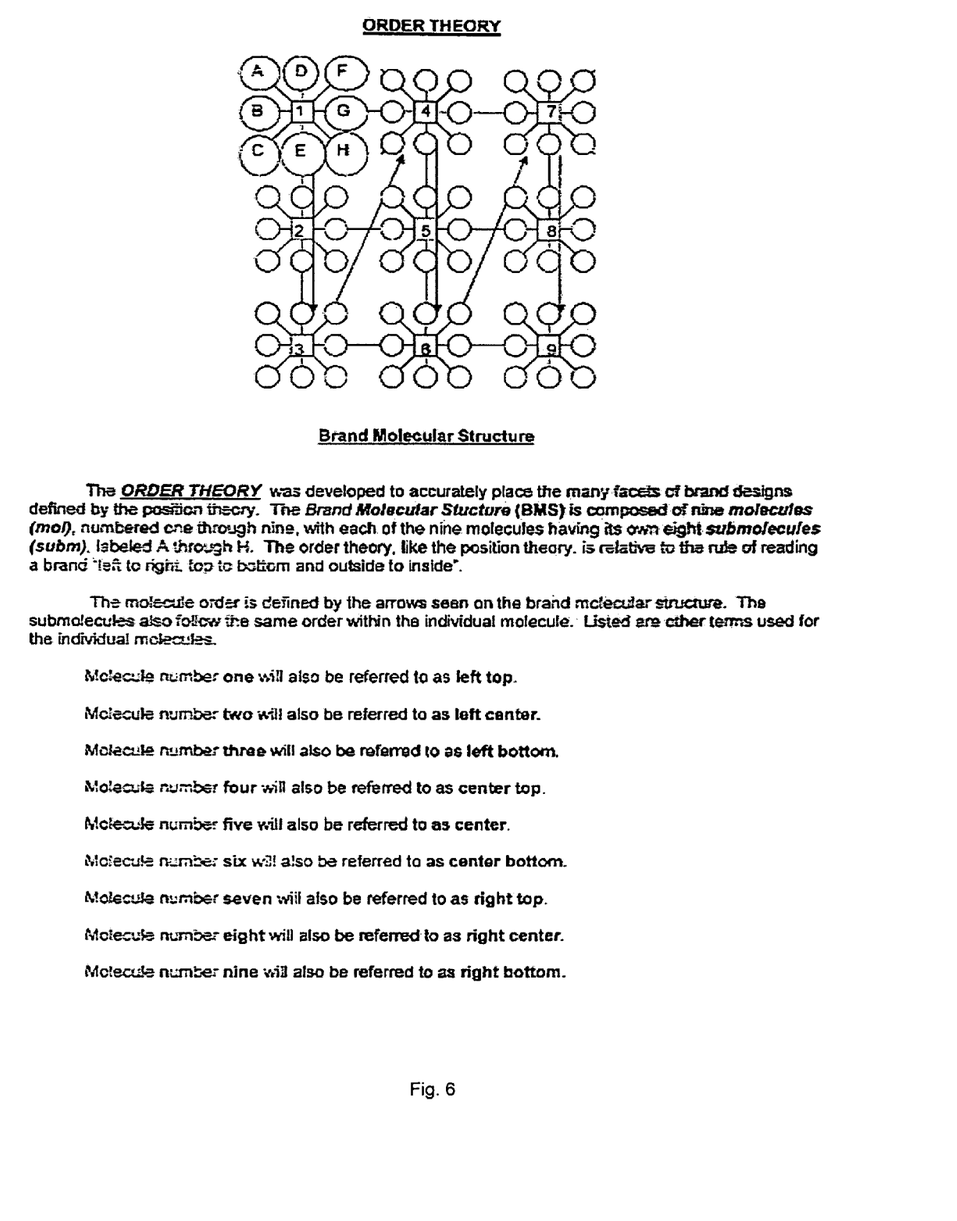
FIG. 6 is a chart which illustrates order theory for brands.

The term, short letters is referring to a letter that holds the definition on four spokes of the wheel then changes to a different letter, character, or number value when rotated (counter clockwise) on the remaining four spokes of the wheel. See figures 4-6.

Figure 4:
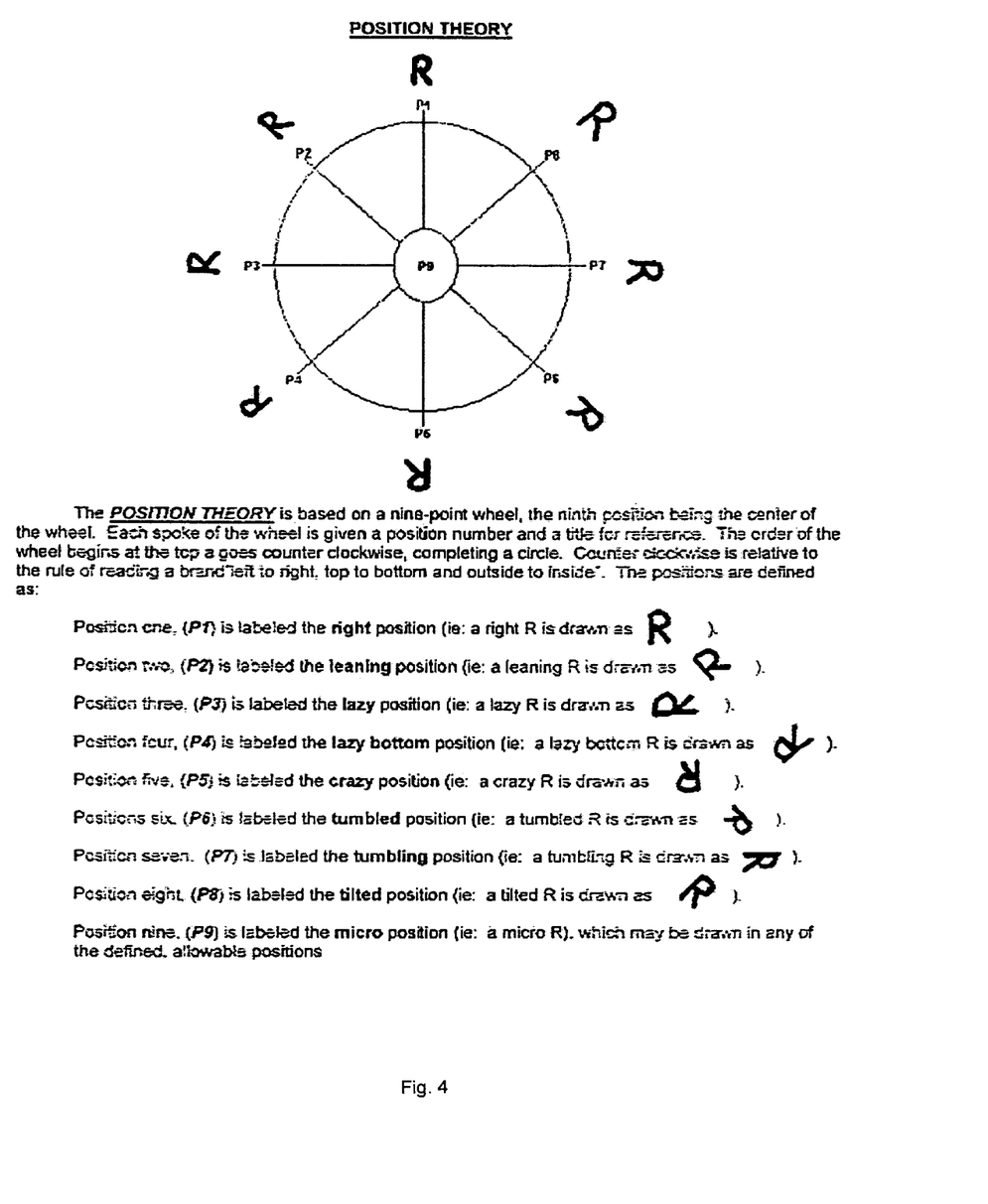
FIGS. 4 and 5 are charts which illustrate position theory for brands.

Figure 4 displays how the letter "J" changes UPV at P4, P5, P6 and P7. The letter "J" evolves into the cane character at these positions. Therefore, there are no P4, P5, P6 and P7 positions for the letter "J" (see figure 5). The same thing occurs with the cane character (see figure 6). There are a few short letters and numbers that apply to this change of UPV by rotation.

Fig. 5

ORDER THEORY

Brand Molecular Structure

The ORDER THEORY was developed to accurately place the many facets of brand designs defined by the position theory. The *Brand Molecular Structure* (BMS) is composed of nine *molecules* (*mol*), numbered one through nine, with each of the nine molecules having its own eight *submolecules* (*subm*), labeled A through H. The order theory, like the position theory, is relative to the rule of reading a brand "left to right, top to bottom and outside to inside".

The molecule order is defined by the arrows seen on the brand molecular structure. The submolecules also follow the same order within the individual molecule. Listed are other terms used for the individual molecules.

Molecule number one will also be referred to as left top.

Molecule number two will also be referred to as left center.

Molecule number three will also be referred to as left bottom.

Molecule number four will also be referred to as center top.

Molecule number five will also be referred to as center.

Molecule number six will also be referred to as center bottom.

Molecule number seven will also be referred to as right top.

Molecule number eight will also be referred to as right center.

Molecule number nine will also be referred to as right bottom.

Fig. 6

The Order Theory has a few general rules that govern each brand digit placement. Keep in mind the term digit refers to all additions, alpha, numeric, and character brand marks.

Rule one through four will be referring to running, stacked, three quarter slant (top left to bottom right), and three quarter slant (top right to bottom left) not connected.

Rule #1. Running brands: One digit brands are placed in the *center*.
Two digit brands are placed at the *left center* and *the right center*.
Three digit brands are placed at the *left center, center* and *right Center*.
Four digit brands are placed at the *left center, center, right center* and *right center subm g*.
Five digit brands are placed at the *left center, center, right center subm b, right center* and *right center subm g*.

Rule #2. Stacked brands: One digit brands are placed in the *center*.
Two digit brands are placed in the *center top* and *the center bottom*.
Three digit brands are placed in the *center top, center* and *center bottom*.
Four digit brands are placed in the *center top, center, center bottom* and *center bottom subm e*.
Five digit brands are placed in the *center top, center, center bottom subm d, center bottom* and *center bottom subm e*.

Rule #3. Three quarter slant, top left to bottom right: One digit brands are placed in the *center*.
Two digit brands are placed in the *left top* and *the center*.
Three digit brands are placed in the *left top, center* and *right bottom*.
Four digit brands are placed in the *left top, center, right bottom* and *right bottom subm h*.
Five digit brands are placed in the *left top, center, right bottom Subm a, right bottom* and *right bottom subm h*.

Rule #4. Three quarter slant, top right to bottom left: One digit brands are placed in the *center*.
Two digit brands are placed at the *left bottom* and *center*.
Three digit brands are placed at the *left bottom, center* and *right top*.
Four digit brands are placed at the *left bottom, center, right top* and *right top subm f*.
Five digit brands are placed at the *left bottom, center, right top subm c, right top* and *right top subm f*.

An example of a digit placement will require the position theory definitions. In the first example of digit placement we will be taking the position definition for the letter A and the number 4.

The brand A4 placement is as follows: The A is a 1PA and it is placed in the *left center mol* and the number 4 is also a 1P4 and it is placed at the *right center mol*.

Fig. 7

In the second example refer to the position definition for number five and and the position definition for the character symbol cent.

For the brand 5¢ placement is as follows: The number 5 is a 1P5 and it is placed at the *left center mol* and the character symbol cent is placed at the *right center mol*.

In the second group of rules one through six, the rules will pertain to the brand digits that are connected at one or more points. This digit placement will utilize the individual molecules and their submolecules more often than the non-connected brand digits.

Rule #1. Molecule Five and its Submolecules will be the most utilized placement for connected brands.

Rule #2. Running connected: <u>two</u> digit brands will be placed at *Mol 5 and Submol 5G*.
        <u>three</u> digit brands will be placed at *Submol 5B, Mol 5 and Submol 5G*.

Rule #3 Stacked brands: <u>two</u> digit brands will be placed at *Mol 5 and Submol 5E*.
        <u>three</u> digit brands will be placed at *Submol 5D, Mol 5 and Submol 5E*.

Rule #4 Three quarter slant, top left to bottom right: <u>two</u> digit brands will be placed at *Mol 5 and Submol 5H*.
        <u>three</u> digit brands will be placed at *Submol 5A, Mol 5 and Submol 5H*.

Rule #5 Three quarter slant, top right to bottom left connected: <u>two</u> digit brands will be placed at *Mol 5 and Submol 5F*.
        <u>three</u> digit brands will be placed at *Submol 5C, Mol 5 and Submol 5F*.

Rule #6 When you have a three digit brand but only two letters are connected consider the two connected digits as one digit and apply the first set of rules when determining their placement and follow the pattern of the second set of rules when placing the connected digits in the molecule dictated by the first set of rules (a different molecule than five).

Fig. 8

BRAND RECOGNITION SYSTEM

CROSS-REFERENCE TO RELATED APPLICATIONS

This application claims the benefit of the filing of U.S. Provisional Patent Application Ser. No. 60/535,676, entitled "Livestock Identification", filed on Jan. 9, 2004, and of U.S. Provisional Patent Application Ser. No. 60/592,444, entitled "Livestock Brand Recognition System", filed on Jul. 30, 2004, and the specifications thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

A compact disc appendix is included containing computer program code listings pursuant to 37 C.F.R. 1.52(e) and is hereby incorporated by reference in its entirety. The total number of compact discs is 1 including 2 files and 2,207,063 bytes. The source code of a Microsoft Access database embodying the invention is provided both as an ASCII text file and, for clarity, as an Adobe Acrobat PDF file.

COPYRIGHTED MATERIAL

© 2004 Nickel Brand Software, Inc. A portion of the disclosure of this patent document, of the compact disc appendix, and of the related applications listed above contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to a system for brand recognition. Particularly, the present invention relates to an electronic and automated system for recognizing brands used on livestock.

2. Description of Related Art

The United States Animal Identification Plan (www.usaip.info) states that an effective animal identification program is essential to achieving the goals of protecting human health, providing wholesome, reliable and secure food resources, mitigating national economic threats, and enhancing a sustainable environment. An extended quote from the Plan is in order, to wit: "Fundamental to controlling any disease threat, foreign or domestic, to the nation's animal resources is to have a system that can identify individual animals or groups, the premises where they are located, and the date of entry to that premises. Further, in order to achieve optimal success in controlling or eradicating an animal health threat, the ability to retrieve that information within 48 hours of confirmation of a disease outbreak and to implement intervention strategies is necessary. The USAIP is focused on utilizing state-of-the-art national and international standards with the best available and practical technologies. It is dynamic and flexible, and will incorporate new and proven technologies as they become available. States' needs in implementing animal identification will receive priority within the uniformity provided by federal oversight. The USAIP currently supports the following species and/or industries: bison, beef cattle, dairy cattle, swine, sheep, goats, camelids (alpacas and llamas), horses, cervids (deer and elk), poultry (eight species including game birds), and aquaculture (eleven species). Implementation will be in three phases: Phase I involves premises identification; Phase II involves individual or group/lot identification for interstate and intrastate commerce; and Phase III involves retrofitting remaining processing plants and markets and other industry segments with appropriate technology that will enhance our ability to track animals throughout the livestock marketing chain to protect and improve the health of the national herd. Initial implementation will focus on the cattle, swine, and small ruminant industries. In transition, the USAIP recommends that: all states have a premises identification system in place by July, 2004; unique, individual or group/lot numbers be available for issuance by February, 2005; all cattle, swine, and small ruminants possess individual or group/lot identification for interstate movement by July, 2005; all animals of the remaining species/industries identified above be in similar compliance by July, 2006. These standards will apply to all animals within the represented industries regardless of their intended use as seedstock, commercial, pets or other personal uses. It is well acknowledged that costs associated with the USAIP will be substantial and that a public/private finding plan is justified. Significant state and federal costs will be incurred in overseeing, maintaining, updating, and improving necessary infrastructure. Continued efforts will be required to seek federal and state financial support for this integral component of safeguarding animal health in protecting American animal agriculture."

Not unlike any other industry sector, the meat and livestock industries have their own set of unique needs and challenges relating to identification. Until the very recent past dealing with animals imposed only two basic animal identification needs: legal ownership and traceability. For example, many enterprises manage their stock as groups, and may not use any method of individual identification. In contrast, a stud may use several forms of redundant individual identifiers, depending on his value. Common methods of identification in use today include: brands (cattle); tattoos (swine, stud cattle); plastic ear tags (all species); metal ear tags (cattle, sheep); adhesive or ratchet tail tags (cattle); and temporary paint marks (sheep, cattle). For purposes of the specification and claims unless otherwise specified, any form of graphical indicia used in conjunction with determining livestock ownership is considered a "brand".

Since the 9/11 attacks, the landscape has changed. The livestock industry is certainly moving toward radio frequency identification (RFID), as traditional identification technologies do not easily lend themselves to automation. The American meat and livestock industries are generally viewed as one of the most safe and cost effective in the world. But they are also conservative, extremely pragmatic and very cost sensitive. New technology is viewed cautiously and often presents economic and other implementation issues that must be resolved prior to wide scale adoption.

Radio Frequency Identification (RFID)

RFID comply with ISO Standards 11784 and 11785 (134.2 KHz). Beyond the ISO standards, industry specific performance criteria, such as minimum read distances (critical in situations such as sales yards, slaughterhouses, or feedlots) and device retention on the animal still have to be settled upon. RFID ear tags and rumen pellets are commonly used.

Subcutaneous implants have device migration, rejection, breakage and recovery problems. The RFID must work reliability in an environment that is always dirty, often wet, and usually never line of sight reading. Further, the supporting IT systems must be rugged, robust and simple to use.

Branding

Hot iron branding was used in ancient Egypt, and has been around for at least 4000 years. Today, a brand registration certificate confers upon the person to whom it is issued the right to use the recorded brand in a given location on an animal, until the right is forfeited or cancelled. Such right is a property right and may be sold or transferred.

State livestock identification organizations recognize brands on cattle as proof of ownership for as long as that animal is alive, wherever it is. Brands appear on bills of sale or consignments. Brand inspections are extensively used in the following: whenever cattle are sold or ownership is transferred; prior to movement out of state; prior to movement out of any designated modified point-of-origin inspection area, for purposes other than sale or slaughter and no change of ownership is involved; upon movement to a destination point (sales yard, slaughterhouse, or feedlot); upon entry into a feedlot; prior to slaughter; prior to release or sale from a public sales yard or public or private cattle sales market; and prior to transportation or movement from premises designated as quarantine, restricted, or isolated areas. Brands are also used when missing or stolen livestock are reported to assist local law enforcement agencies. This helps to establish that losses have occurred, assist in recovering the losses, and advise local law enforcement agencies as to the extent of cattle theft to prevent or deter future crimes.

State brand inspectors typically have the authority to seize animals, hides or carcasses of any such animal found in the possession of a person that cannot prove ownership or presented for inspection and not claimed by either the consignor or consignee.

Brands can be located on the jaw, neck, shoulder, rib, or hip areas on either the right or left side on bovine and the same, except the rib location, on equine. They are usually applied with an iron of width $3/16$ to $1/4$ inch. Circles have a minimum diameter of $3\frac{1}{2}$. Parallel lines or near brand have a minimum spacing of an inch. A gap of $1/4$ inch is placed at the intersection of lines or elements.

Brandabetical Listing

Brands are listed in brand books by numbers or letters, and then by characters or symbols. The letter or character under which the brand is filed is determined by reading the brand from left to right, from top to bottom, or from the outside in. Symbols are filed alphabetically with letters or numbers (e.g., bar, circle, diamond, flying, lazy, quarter circle, rocking, running, leaning, walking, etc.). The manner in which a letter appears in a brand determines how it is read; e.g., Bar U, Lazy H, Leaning E, Rocking R, Circle C, etc. Picture brands (also known as symbol or character brands) are also listed in alphabetical order: ace of spades or clubs; cactus; cross; hook; horseshoes; hourglass; spur; sunrise; turkey track; etc. Earmarks are also indicated next to the brand: crop; split; crop split; under half crop; over half crop; steeple fork; swallow fork; over bit; under bit; shoe string; and jingle bob.

A problem with brandabetical listings is that brands may be read or described differently by different persons. Therefore, to use a brand book, one must know all of the various places that a character or combination brand may be listed. There is thus a present need for a standard brand language to establish a brand communication platform for technology applications.

BRIEF SUMMARY OF THE INVENTION

The present invention is of computer software for and method of determining livestock ownership, comprising: inputting an image of a livestock brand whose ownership is to be determined; automatically determining one or more computed closest fits to the image from a database of livestock brands; and outputting owner information from the database of livestock brands concerning one or more of the one or more computed closest fits. In the preferred embodiment, the input is either or both of a digital photographic image and a user input drawing. The determining step comprises providing the image to one or more of a set of one or more trained neural networks, optionally after having performing feature extraction on the image, which can then be used to determine which of the set of one or more trained neural networks to which the image is provided. Outputting preferably presents a plurality of brands from the database to a user and permits the user to choose one or more of the plurality for ownership information output. Optionally the user inputs one or more user-extracted features prior to the determining step, and the one or more user-extracted features determines which of the set of one or more trained neural networks to which the image is provided. Preferably the invention is performed at least in part via personal digital assistant hardware.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS 7 and 8 are charts which illustrate general rules for order theory and digits for brands.

DETAILED DESCRIPTION OF THE INVENTION

The present invention is directed to a system enabling advancements in the field of animal and livestock branding. The system of the invention preferably replaces brand books with a handheld personal digital assistant programmed to identify brands using software similar to the Graffiti handwriting recognition on Palm® or like hand-held devices. The present invention provides a practical recognition system for a very large (>250,000) and complex character set while remaining within the computational capabilities of the current technology of palm-sized computers.

Instead of carrying a brand book, the preferred embodiment of the present invention instead provides a personal digital assistant (PDA), a small, fully functional computer that can be held in one hand. The idea of making a small hand-held computer for storing addresses and phone numbers, taking notes and keeping track of daily appointments originated in the 1990s, although small computer organizers were available in the 1980s. In 1996, the Palm Pilot was introduced, which was small and light enough to fit in a shirt pocket, ran for weeks on AAA batteries, was easy to use and could store thousands of contacts, appointments and notes. Though originally intended to be a simple digital calendar, today's PDA can perform complex calculations, play games or music, and download information from the Internet.

PDAs fall into two major categories: hand-held computers and palm-sized computers. The major differences between the two are size, display and mode of data entry. Compared to palm-sized computers, hand-held computers tend to be larger and heavier. They have larger liquid crystal displays (LCD) and use a miniature keyboard, usually in combination with touch-screen technology, for data entry. Palm-sized computers are smaller and lighter. They have smaller LCDs and rely on stylus/touch screen technology and handwriting recognition programs for data entry. Most palm-sized PDAs can fit into a shirt pocket, and vary in weight from 4 to 8 ounces (113 to 227 grams).

PDAs are powered by microprocessors, which coordinate all of the PDA's functions according to programmed instructions. Unlike desk and laptop PCs, PDAs use smaller, cheaper microprocessors, such as the Motorola Dragonball, Multiprocessor without Interlocked Pipeline Stages (MIPS), or Hitachi's SH7709a. Although these microprocessors tend to be slower than their PC counterparts (clock speeds of 50 to 100 MHz, compared with over 1 GHz in PCs), they are adequate for the tasks that PDAs perform. The benefits of small size and price outweigh the cost of slow speeds.

A PDA does not have a hard drive. It stores basic programs (address book, calendar, memo pad and operating system) in a read-only memory (ROM) chip, which remains intact even when the machine shuts down. Data are stored in the device's RAM. This approach has several advantages over standard PCs. When the PDA is powered on, all programs are instantly available (no waiting for applications to load). Any changes are stored automatically (no need for a "Save" command). When the PDA is powered off, the data is still safe, because the PDA continues to draw a small amount of power from its batteries to continue to store data in the RAM.

All PDAs use solid-state memory. Some incorporate removable forms of memory, such as SD cards. One megabyte of memory can store up to 4,000 addresses. PDAs usually have 5 to 32 Mb of memory. In some PDA models, the amount of memory is upgradeable. Since state brand books may have up to 70,000 listings, finding a PDA with sufficient memory is not an issue.

PDAs are powered by batteries. Some models use alkaline (MA) batteries, while others use rechargeable batteries (lithium, nickel-cadmium, or nickel-metal hydride). Battery life can vary from two hours to two months depending upon the PDA model and its features.

Figure 1:
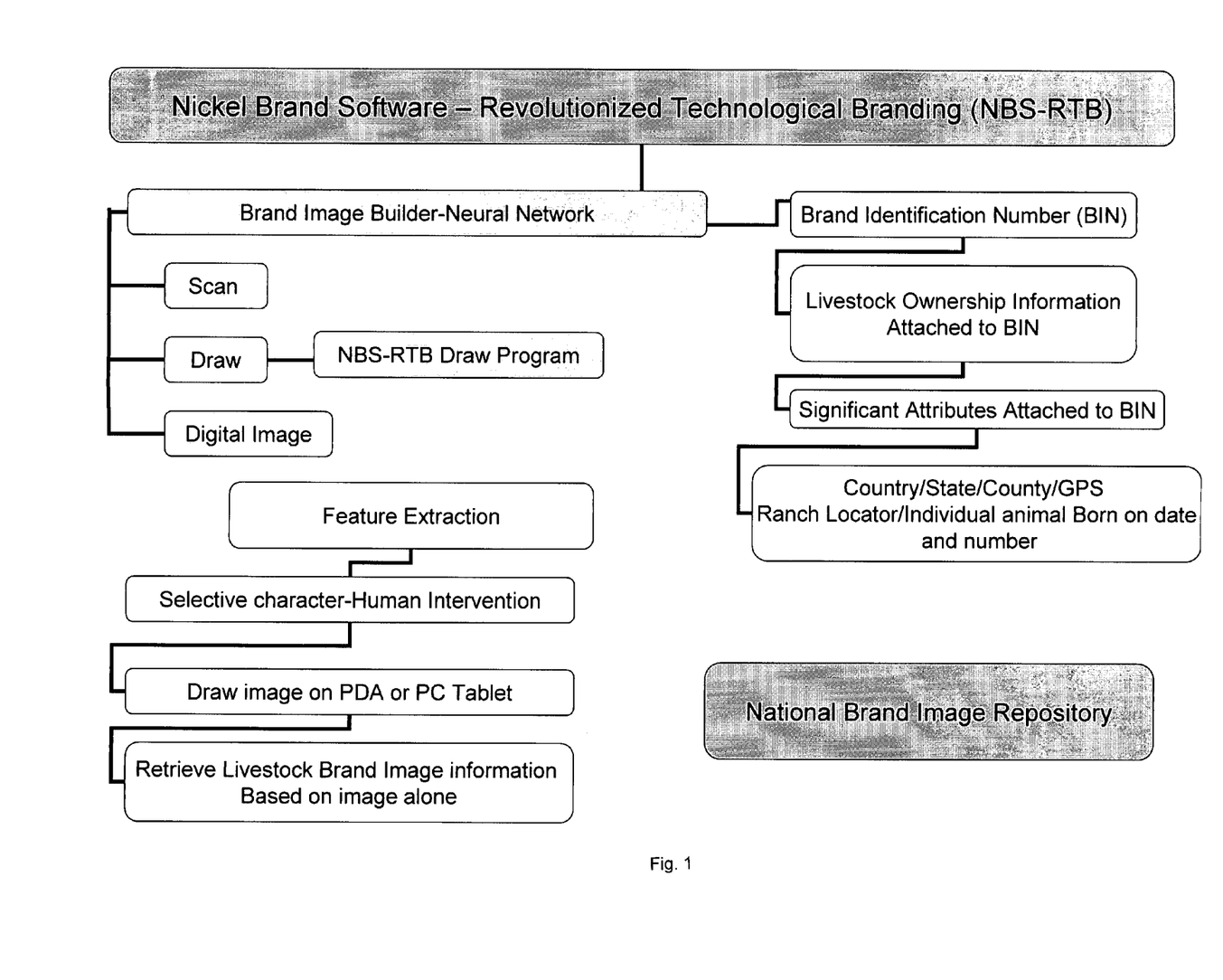
FIG. 1 is a diagram illustrating the preferred components of the invention.

In the invention, there are three methods of data entry, each of which can be programmed for use by a brand inspector in the field: touch screen, camera, or voice recognition. As shown in FIG. 1, these are scanning, drawing, and using digital images.

Most palm-sized PDAs have four-inch (10 cm) square screens which are used for both output and input. The screen displays information with an LCD. On top of the LCD sits a touch screen that lets the user launch programs by tapping on the screen with a pen-like stylus or enter data by writing on it.

In order to use a PDA for brand recognition, using a plastic stylus, the brand inspector first draws a brand on the device's touch screen. Next, software inside the PDA matches the drawing to the letters, numbers, and symbols of listed brands. To help the software make more accurate matches, the brand inspector can use an onscreen keyboard, and tap on the letters or numbers with the stylus.

Some PDAs now have a built-in digital camera that can be used to capture an image of the brand directly off the animal. Software can be used to extract the brand from the image, which is then processed similar to the processing of the touch screen drawing, previously described. The brand inspector can assist in the process by cropping the image and tracing the brand.

Various sensors can be connected to a PDA which enable data to be input into it. Such sensors can include metal and/or plastic sensing sensors. A branding iron can be dipped into or brushed with a solution containing a metallic and/or plastic particles and/or ions. Upon branding the livestock with an iron so treated, a portion of the metal and/or plastic particles and/or ions are thus fixedly secured within the livestock's hide. Metal and/or plastic sensing sensors can then be used to scan the brand into a PDA. The PDA can thus not only store the image into the data bank of known brands, but also retrieve the most closely matching brand or brands.

Colored indicia can also be affixed to the livestock. Although numerous ways of affixing colored indicia can be used and will produce desirable results, it is preferred that a colored tattoo or a branding iron treated with a colored die be used to affix the colored indicia. A color sensing sensor can then be attached to a PDA and used to scan the indicia into the PDA not only for data entry purposes but also for brand identification purposes.

Advanced PDAs incorporate voice recognition technology. This enables the brand inspector to read the brand while speaking into a built-in microphone. Software converts the voice sound waves into letter, number and symbol data that can be matched against listed brands. The PDA can be programmed with other specific sounds which are then equated with a specific brand. When these defined sounds are later input into the PDA, the associated brand can be displayed on the PDA screen.

The central focus is to identify some form of automated or semi-automated character recognition software that can be easily implemented on a PDA. There are numerous algorithms that perform this task. These fall into two basic categories: feature extraction methods that use artificial intelligence techniques for classification, and neural network approaches that require virtually no preprocessing.

The proposed approach to the area of pattern recognition preferably uses a PDA to implement the pattern recognition algorithms, as also shown in FIG. 1. Any character image is captured (preferably by the touch screen or camera) and then image digitization is performed. The process of digitization vertically and horizontally partitions the image pixels, and assigns a value to each pixel. The value assigned to a pixel of a monochrome image varies according to its brightness or gray level. The image digitization is preferably accomplished manually by overlaying a grid over the handwritten character images.

In feature extraction methods, the digitized image is preferably further processed using image processing techniques in order to perform the recognition task. The general idea of the feature extraction is to identify characters based on features that are somewhat similar to the features humans use to identify characters. The rationale is that when the algorithm does misclassify a character, as any algorithm occasionally may, it should pick a character that a human would consider to be a reasonable guess. This is because it is easier for humans to correct mistakes that are typical of humans (i.e. it is easier to get "Save" out of "5ave" than "Mave"). Feature extraction methods have achieved better than a 99.9% recognition for printed characters in most fonts for the 68 English character set. When applied to handwritten characters, writer-independent recognition rates better than 92% have been achieved. However, the feature extraction method of pattern recognition is a computationally intensive and time consuming task due to the vast amount of image data and large number of computation steps. Using the conventional approach typically demands a very high-speed computer or a parallel computer system to perform a satisfactory recognition. FIGS. 4-8 illustrate two preferred feature extraction methods, referred to as the "Position Theory" and the "Order Theory".

Character recognition for brands pose new and interesting pattern recognition problems when compared to recognition of the 68 English character set. The size of the corpus is daunting, in that there are brands contain tens of thousands of characters, including a few hundred symbols. However, since most brands contain either a letter or a number, an alphabetical listing can be used to reduce the candidate character set to hundreds. From a pattern recognition standpoint, brands are of widely varying complexity, consisting of a few to tens of distinct strokes. Differences between brands can be quite small. In contrast, the differences between handwriting styles can be significant. Both of these factors together are a potential problem for feature extraction methods of writer-independent recognition techniques. Specifically, for a given feature, two brands may have only a small between-class variance and a large within-class variance, implying an overlapping of their distributions.

Figure 2:
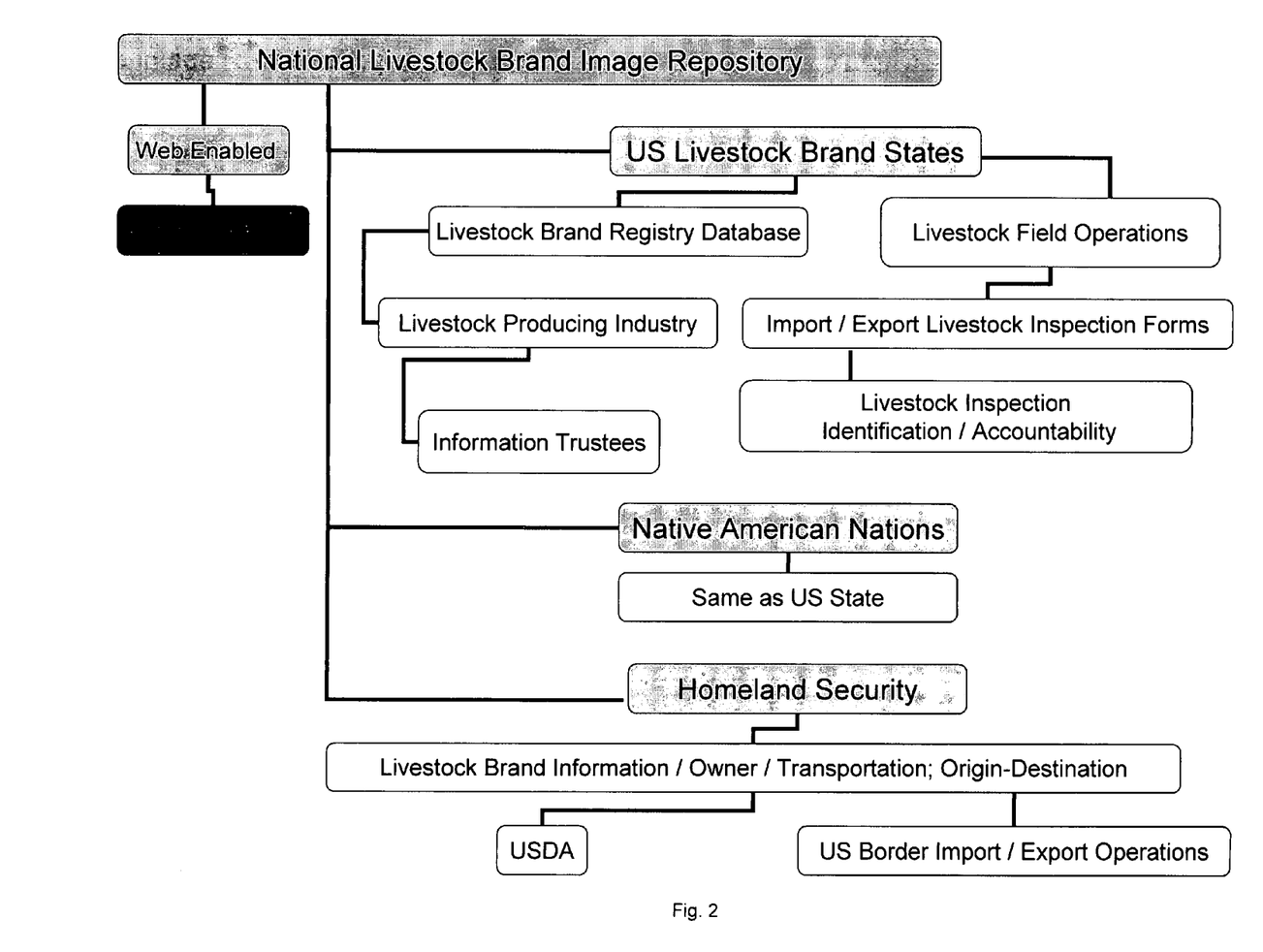
FIG. 2 is a diagram illustrating a preferred livestock brand image repository according to the invention.

FIG. 2 illustrates a possible structure of a national Brand Identification Database incorporating information from States, Native American Nations, and the Department of Homeland Security (other Departments/Agencies could be included as information sources). As shown in FIG. 1, it is preferred that each unique brand be given a Brand Identification Number (BIN) corresponding to the brand.

INDUSTRIAL APPLICABILITY

The invention is further illustrated by the following non-limiting example.

EXAMPLE 1

Neural Network Approach

An embodiment of the present invention was constructed and measurements taken. In this experiment, the focus was to develop a method for character recognition easily implemented on a PDA (both in terms of memory and processing speed). The neural net approach utilized three separate steps. The first step simply translated the binary character data into a friendlier form. The second step took the output of the first and trained a backpropagation network on it, thus creating the weights and general network information. The third step took the output of the second and created a network.

The network consisted of 51 inputs, 4 outputs. It was essentially a flat feedforward network that was fully connected without self-inputs or biases. It was made to train on a character set of four "B" brands, shown in FIG. 3.

Figure 3:
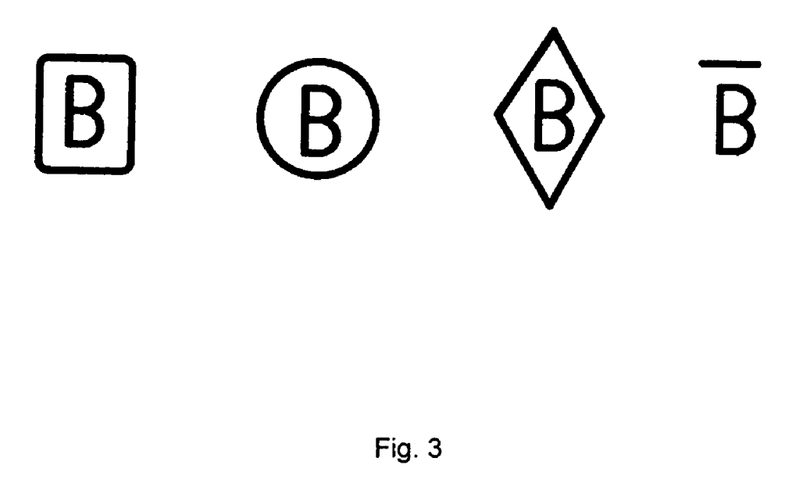
FIG. 3 shows four brands tested in an example of the present invention.

Each training brand was converted into a binary array of 256 (16×16) pixels. A pixel was taken to be zero if the pixel was empty, otherwise the pixel was interpreted as a one. The pixel array was then converted into a set of 51 binary words of 5 bits each (one pixel discarded). The four sets of 51 values were used to train the neural network. Each of the four outputs corresponded to one of the four characters in the training set. By applying a threshold of 0.65, the neural network was able to correctly categorize the training data set.

The network was made to learn properly by using a step size of 1.05. It converged fairly quickly and only required one-hundred thirty-nine sweeps through the training data set. The resulting C code is compact, and easily implemented on a PDA. A complete listing of the "Box B" brand classifier is provided in the CD-ROM appendix. Once properly trained, the network was tested using 27 hand drawn images of the "Box B" brand from different writers. The purpose of testing images of the same brand was to create an evaluator distribution biased toward images with high variance. Table 1 summarizes the results.

TABLE 1

"Box B" Brand Recognition Results.

| | | |
|---|---|---|
| Total Correct | 20 | 74% |
| Total Unknowns | 1 | 04% |
| Total Wrong | 6 | 22% |
| Total Wrong Or Unknown | 7 | 26% |

A "correct" recognition meant that the output from node corresponding to the correct brand exceeded the threshold of 0.65, and the other node outputs were less than 0.65. An "Unknown" condition occurred when two or more output node values exceed the 0.65 threshold. A "wrong" recognition meant that the only output node that exceeded 0.65 did not correspond to the correct brand.

Overall, the results of the neural net approach are promising. Even though the neural network does not do as good of a job as making typical human guesses, the network achieved a reasonable recognition rate (approximately 3 out of four brand images correctly identified) much faster than the feature extraction method can. This is primarily due to the fact that while the feature extraction method has to use a dictionary and do a character by character comparison for each symbol to be identified at runtime, the neural network learned everything it needed to know about the training data set during its training phase and could get results for an input character with a single feedforward pass.

Based on the results of this example, it appears that the best method combines a neural network with simple feature extraction. The letter or number of a brand (or none, in the case of a symbol) would be provided by the human brand inspector prior to drawing (or otherwise capturing) the brand image. It is relatively easy create thirty or so neural networks trained on reduced data sets of a few hundred brands. Then, instead of an exact match, the neural network need only provide a half dozen or so nearest matches from which the brand inspector may choose. Further, such a combined approach would maintain the desirable aspect of the feature extraction method of generally making human-like mistakes while utilizing the neural net method's identification speed and efficient use of memory. The hybrid approach to character recognition makes many other options possible. As such the hybrid approach likely provides the greatest opportunity for advancement.

The following source code was employed for this example:

```
/*
** Source-code export of boxb classifier
**
** The calling interface is:
**    int boxb(float *inputs, float *outputs);
** User must allocate both <inputs> and <outputs> vector of right size
** User instantiates <inputs> vector with values
** Routine returns confidences in <outputs> vector
**
** The boxb classifier has the following characteristics:
**    51 inputs, 4 outputs
**    inputs normalized: zscore all.
**    1 hidden layer
*/
#include <stdio.h>
#include <math.h>
#include <float.h>
#define NUM_INPUTS 51
#define REDUCED_INPUTS 51
#define HIDDEN1_NODES 3
#define NUM_OUTPUTS 4
#define MAX_EXP 87.4982
static long double zs_input_mean[REDUCED_INPUTS] = {30.6206, 31.611,
30.2667,
    29.9928, 30.3558, 29.2279, 29.3702, 28.1545, 28.5501, 30.0491,
29.2847,
    28.345, 28.0634, 28.7693, 27.4841, 28.0017, 29.018, 28.7723, 29.0319,
    28.5364, 27.2141, 28.2663, 29.2375, 29.4515, 30.2267, 28.0879,
27.2843,
    28.8789, 29.2256, 28.451, 28.7079, 28.272, 28.887, 28.7636, 27.521,
29.6936,
    28.3663, 28.0497, 28.4201, 27.8664, 29.1963, 29.4301, 28.4921,
27.5566, 27.7,
    29.7977, 29.6375, 28.8851, 27.8424, 28.2012, 28.7186};
static long double zs_input_stdv[REDUCED_INPUTS] = {1.89123, 0.997605,
    1.18183, 1.79235, 1.07888, 1.93234, 0.982106, 2.59014, 1.93563,
1.34539,
    1.92172, 3.16864, 2.23749, 1.60821, 2.05478, 1.70533, 0.977536,
0.144627,
    1.2849, 3.04248, 1.67466, 1.39229, 0.606413, 0.965352, 1.71211,
2.90128,
    3.3503, 2.16772, 1.37004, 2.21307, 2.03535, 0.8001, 1.70333, 1.79761,
    0.367722, 0.88041, 0.97179, 1.14356, 2.97562, 0.348377, 1.97472,
1.93038,
    0.909384, 0.536688, 1.19674, 2.0572, 1.66003, 2.15022, 2.24699,
1.64026,
    2.4557};
static float hidden1_weights[HIDDEN1_NODES][REDUCED_INPUTS+1] = {
  {(float)0.0189219, (float)-0.0315216, (float)0.0232004,
(float)0.122034,
    (float)0.00612391, (float)-0.0214939, (float)-0.107181, (float)-
0.0958337,
    (float)-0.0414492, (float)-0.171956, (float)-0.142566, (float)-
0.0870238,
    (float)-0.0531942, (float)-0.127586, (float)-0.104031, (float)-
0.0725004,
    (float)-0.10342, (float)-0.029711, (float)-0.0700117, (float)-
0.0693086,
    (float)0.0183535, (float)-0.0751811, (float)-0.105334,
(float)0.0298708,
    (float)-0.124863, (float)-0.00144494, (float)-0.0911772, (float)-
0.111331,
    (float)-0.08092, (float)-0.146582, (float)-0.114639, (float)-
0.0912535,
    (float)-0.0358387, (float)0.138797, (float)0.0500132, (float)-
0.097658,
    (float)-0.0950008, (float)-0.00653585, (float)-0.0893031, (float)-
0.0625927,
    (float)-0.166791, (float)-0.0187604, (float)-0.140171,
(float)0.0174065,
    (float)-0.12255, (float)-0.13787, (float)-0.11228, (float)-0.0821552,
    (float)-0.0566246, (float)0.0805329, (float)-0.171502, (float)-
0.0646852},
  {(float)0.0135417, (float)-0.0841286, (float)0.047912,
    (float)0.0532753,
(float)-0.0851244, (float)-0.0851112, (float)-0.0699413, (float)-
0.0585017,
```

-continued

```
    (float)0.021759, (float)-0.0508943, (float)0.0270625, (float)-
0.0383367,
    (float)-0.128952, (float)-0.0956666, (float)-0.0688051, (float)-
0.141014,
    (float)0.0230532, (float)0.0983907, (float)-0.125534, (float)-
0.0870626,
    (float)-0.0937366, (float)-0.0405758, (float)0.0279616,
(float)0.0525958,
    (float)-0.0499612, (float)-0.10644, (float)-0.0602268,
(float)0.0321071,
    (float)0.0475443, (float)-0.00437831, (float)0.120719,
(float)0.0423054,
    (float)-0.0838271, (float)0.0878412, (float)-0.0653821, (float)-
0.0487746,
    (float)0.0866966, (float)-0.0982654, (float)-0.111527, (float)-
0.0533627,
    (float)-0.0352725, (float)0.0298279, (float)-0.099188,
(float)0.12351,
    (float)0.0155371, (float)0.0716237, (float)-0.0568804,
(float)0.0107407,
    (float)-0.0566867, (float)-0.0621535, (float)-0.0369329,
(float)0.114871},
    {(float)-0.182714, (float)0.10488, (float)-0.04605, (float)-0.0305115,
    (float)-0.0339001, (float)0.0277205, (float)0.0575316, (float)-
0.0201452,
    (float)-0.164098, (float)0.00527888, (float)-0.0413337,
(float)0.0423315,
    (float)0.133031, (float)0.0380008, (float)-0.0702753,
(float)0.088427,
    (float)0.078035, (float)-0.209038, (float)-0.0211791,
(float)0.134203,
    (float)0.120216, (float)-0.154458, (float)-0.112957, (float)-
0.203229,
    (float)0.0317611, (float)0.0751905, (float)-0.0521011, (float)-
0.151562,
    (float)-0.121269, (float)0.0191151, (float)-0.0554355, (float)-
0.071968,
    (float)0.157827, (float)-0.123131, (float)-0.0623518, (float)-
0.0606219,
    (float)0.00554715, (float)0.0705721, (float)0.0944574,
(float)0.104984,
    (float)0.0839292, (float)-0.166005, (float)-0.042294, (float)-
0.211927,
    (float)0.0287667, (float)0.0530575, (float)0.117674, (float)-
0.151882,
    (float)-0.115984, (float)0.149343, (float)-0.0386118,
(float)0.0681668}
};
static float output_weights[NUM_OUTPUTS][HIDDEN1_NODES+1] = {
    {(float)-0.2979, (float)-0.552177, (float)0.83898, (float)-0.745063},
    {(float)-0.476907, (float)-0.272194, (float)-0.853608, (float)-
0.662662},
    {(float)0.396938, (float)-0.651735, (float)0.158293, (float)-0.7039},
    {(float)0.657098, (float)0.450756, (float)-0.583611, (float)-0.497126}
};
static float tanhoid(float x)
{
    float f;
    if (x < -MAX_EXP)
        return((float)-1.0);
    f = (float)exp(-x);
    f = (float)1.0 / ((float)1.0 + f);
    f = f * (float)2.0 - (float)1.0;
    return(f);
}
static float sigmoid(float x)
{
    float f;
    /* SIGH(x) = 1.0 / (1.0 + E^-x) */
    f = (float)exp(-x);
    if (f == (float)FLT_MAX) /* 1.0 / (1.0 + INF) = 0 */
        f = (float)0.0;
    else if (f == (float)FLT_MIN) /* 1.0 / (1.0 + 1.0) = 0.5 */
        f = (float)0.5;
    else
        f = (float)1.0 / ((float)1.0 + f);
    return(f);
}
int boxb(float *inputs, float *outputs)
```

```
{
    float hidden1_outputs[HIDDEN1_NODES];
    float sum;
    unsigned i,j;
    float final_inputs[REDUCED_INPUTS];
    /* zscore input normalization */
    for (i=0; i<REDUCED_INPUTS; i++)
        final_inputs[i] = (float) ((inputs[i] – zs_input_mean[i]) /
zs_input_stdv[i]);
    inputs = final_inputs;
    for (i=0; i<HIDDEN1_NODES; i++)           /* hidden layer 1 */
    {
        sum = hidden1_weights[i][REDUCED_INPUTS];     /* threshold */
        for (j=0; j<REDUCED_INPUTS; j++)
            sum += hidden1_weights[i][j] * inputs[j];
        hidden1_outputs[i] = tanhoid(sum);            /* tanh transfer */
    }
    for (i=0; i<NUM_OUTPUTS; i++)             /* output layer */
    {
        sum = output_weights[i][HIDDEN1_NODES];       /* threshold */
        for (j=0; j<HIDDEN1_NODES; j++)
            sum += output_weights[i][j] * hidden1_outputs[j];
        outputs[i] = sigmoid(sum);            /* sigmoid output */
    }
    return (0);
}
```

The preceding example can be repeated with similar success by substituting the generically or specifically described operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of determining livestock ownership, the method comprising:

inputting a plurality of livestock brands establishing a database;

inputting into a computer by a user drawing with an input device an image of a physical livestock brand whose ownership is to be determined;

automatically determining using a computer processor in communication with said database one or more closest fits to the image from the database of livestock brands; and outputting owner information from the database of livestock brands concerning one or more of the one or more computed closest fits back to the user.

2. The method of claim 1 wherein inputting comprises a user tracing a photographic image of a physical livestock brand.

3. The method of claim 1 wherein inputting comprises a user inputting by drawing an image of the brand while observing the brand on livestock.

4. The method of claim 1 wherein determining comprises providing the image to one or more of a set of one or more trained neural networks.

5. The method of claim 4 wherein determining additionally comprises performing feature extraction on the image.

6. The method of claim 5 wherein results of the feature extraction determines which of the set of one or more trained neural networks to which the image is provided.

7. The method of claim 1 wherein outputting comprises presenting a plurality of brands from the database to a user and permitting the user to choose one or more of the plurality for ownership information output.

* * * * *

UNITED STATES PATENT AND TRADEMARK OFFICE
CERTIFICATE OF CORRECTION

PATENT NO. : 7,593,856 B2
APPLICATION NO. : 11/032638
DATED : September 22, 2009
INVENTOR(S) : Loretta A. Martinez It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Fourteenth Day of December, 2010

David J. Kappos
*Director of the United States Patent and Trademark Office*